United States Patent
Cornell et al.

[19]

[11] Patent Number: 6,054,551

[45] Date of Patent: Apr. 25, 2000

[54] POLYESTER COMPRISING A RESIDUE OF ISOPHTHALIC ACID, TEREPHTHALIC ACID, ETHYLENE GLYCOL AND AN AROMATIC DIOL DERIVATIVE

[75] Inventors: David Dunlap Cornell, Kingsport, Tenn.; Timothy Edward Long, Blakesburg, Va.

[73] Assignee: Eastman Chemical Company, Kingsport, Tenn.

[21] Appl. No.: 09/353,485

[22] Filed: Jul. 13, 1999

Related U.S. Application Data

[60] Provisional application No. 60/092,749, Jul. 14, 1998.

[51] Int. Cl.[7] ........................................ C08G 63/00
[52] U.S. Cl. ........................ 528/176; 528/190; 528/193; 528/194; 528/195; 528/298; 528/300; 528/302; 528/367; 528/308; 528/308.6; 106/31.13
[58] Field of Search ..................................... 528/176, 190, 528/193, 194, 195, 298, 300, 302, 307, 308, 308.6; 106/31.13

[56] References Cited

U.S. PATENT DOCUMENTS

| | | |
|---|---|---|
| 4,267,301 | 5/1981 | Olsen et al. . |
| 4,383,107 | 5/1983 | Lohse et al. . |
| 4,396,783 | 8/1983 | Esposito et al. . |
| 4,436,895 | 3/1984 | Barbee et al. . |
| 4,440,922 | 4/1984 | Barbee et al. . |
| 4,474,918 | 10/1984 | Seymour et al. . |
| 4,546,170 | 10/1985 | Barbee et al. . |
| 4,552,948 | 11/1985 | Barbee et al. . |
| 4,560,741 | 12/1985 | Davis et al. . |
| 4,663,426 | 5/1987 | Wicker, Jr. et al. . |
| 4,959,421 | 9/1990 | Hirahara et al. . |
| 4,982,013 | 1/1991 | Gubelmann et al. . |
| 5,030,705 | 7/1991 | Hirahara et al. . |
| 5,239,045 | 8/1993 | Hirahara et al. . |

*Primary Examiner*—Samuel A. Acquah
*Attorney, Agent, or Firm*—Cheryl J. Tubach; Harry J. Gwinnell

[57] ABSTRACT

A polyester having increased UV absorption comprising (i) a residue of a dicarboxylic acid component comprising terephthalic and from about 1 to about 20 mole % of isophthalic acid, (ii) a residue of a glycol component comprising ethylene glycol, and (iii) from about 0.01 mole % to about 15 mole % of a residue of an aromatic diol derivative, wherein the aromatic diol derivative has a least two polyester reactive groups that are capable of participating in a polyester-forming reaction and the total mole % for components (i), (ii) and (iii) is 200 mole %.

18 Claims, 2 Drawing Sheets

A  0 MOLE % HYDROXYETHYL RESORCINOL-MODIFIED POLYESTER
B  2 MOLE % HYDROXYETHYL RESORCINOL-MODIFIED POLYESTER
C  4 MOLE % HYDROXYETHYL RESORCINOL-MODIFIED POLYESTER

A  0 MOLE % HYDROXYETHYL RESORCINOL-MODIFIED POLYESTER
B  2 MOLE % HYDROXYETHYL RESORCINOL-MODIFIED POLYESTER
C  4 MOLE % HYDROXYETHYL RESORCINOL-MODIFIED POLYESTER

POLYESTER COMPRISING A RESIDUE OF ISOPHTHALIC ACID, TEREPHTHALIC ACID, ETHYLENE GLYCOL AND AN AROMATIC DIOL DERIVATIVE

RELATED APPLICATION

This application claims priority to U.S. provisional application Ser. No. 60/092,749, filed Jul. 14, 1998, which is incorporated herein by reference in its entirety.

BACKGROUND OF THE INVENTION

1. Field of the Invention

The present invention relates to polyesters which are suitable for various applications including the manufacture of formed articles, such as containers. More specifically, the present invention relates to a polyester comprising the residue of a dicarboxylic acid component comprising isophthalic acid and terephthalic acid, a glycol component comprising ethylene glycol, and an aromatic diol derivative.

2. General Background and Description of Related Art

It is well known in the art that poly(ethylene terephthalate) (PET) is useful for many packaging applications. It is also well known and practiced that PET or modified PET is the polymer of choice for making beverage and food containers, particularly carbonated beverage containers. Furthermore, it is known that PET can be modified with additional diacid and/or glycol comonomers on a commercial scale, e.g., isophthalic acid (or dimethyl isophthalate), 1,4-cyclohexanedimethanol (CHDM), and the like.

Modifying PET with additional comonomers may improve some of the physical properties of the resulting polyesters and provide particularly desired properties in an article formed from the polyester such as increased barrier and improved crystallization and processability. Moreover, comonomers may provide these beneficial properties to the resulting PET when used alone or in combination with other monomers. CHDM, for example, improves the ease of processing of a PET resin, but may unfortunately decrease the barrier properties of a resulting container made with the PET resin. Isophthalic acid (IPA), for example, increases the barrier of PET, but may unfortunately decrease the processing window in which acceptable containers can be formed. Therefore, by including CHDM and IPA comonomers in a PET resin, for example, an article may be formed from the PET resin which has improved barrier and easier processing properties.

Using a particular aromatic diol derivative as a copolymer to improve barrier properties has also been disclosed. For example, U.S. Pat. No. 4,440,922 describes polyesters made from phenylenedi(oxyacetic acid), which is also known as and includes resorcinol oxydiacetic acid, hydroquinone oxydiacetic acid, and catechol oxydiacetic acid. However, this reference does not disclose a polyester having the residues of terephthalic acid, isophthalic acid, ethylene glycol and an aromatic diol derivative in mole % amounts to improve UV absorption.

U.S. Pat. Nos. 4,552,948, 4,663,426, and 5,030,705 describe the use of copolyesters containing phenylenedi(oxyacetic acid) for containers. These copolyesters have low permeability. However, because of the high level of modification, these copolyesters are difficult to crystallize. The poor crystallization behavior of these copolyesters makes them difficult to dry and limits the amount of strain induced crystallization that occurs during container fabrication. Low levels of crystallinity in the containers often result in poorer mechanical properties and lower gas barrier. Moreover, these copolyesters may not exhibit improved UV absorption and do not include residues of terephthalic acid, isophthalic acid, ethylene glycol and an aromatic diol derivative in the mole % amounts of this invention.

U.S. Pat. No. 5,239,045 describes copolyesters containing terephthalic acid, ethylene glycol and 0.5 to 4.5 mole % of phenylenedi(oxyacetic acid). However, a polyester having the residues of terephthalic acid, isophthalic acid, ethylene glycol and an aromatic diol derivative in mole % amounts to improve UV absorption is not disclosed. U.S. Pat. No. 4,959,421 describes blends of PET with copolyesters containing isophthalic acid, naphthalenedicarboxylic acid and phenylenedi(oxyacetic acid), but not terephthalic acid, isophthalic acid, ethylene glycol and an aromatic diol derivative in mole % amounts according to the present invention.

Heretofore, polyesters (particularly PET and modified PET) have not displayed significantly improved UV absorption and current polymers are insufficient for all UV absorbance needs. UV absorption is a very beneficial and desirable physical property for polyesters. UV absorption provides articles molded from a polyester (e.g., film and containers) with improved capability to protect the contents of the article, such as food and beverages, from UV degradation. A comonomer that provides improved UV absorption to a resulting polyester has not been used in conjunction with other comonomers to provide a polyester and an article made from such polyester with sufficient barrier, UV absorption and processing properties. All UV absorption efforts have been by adding non-reacting blends of commercial UV absorbers. The commercial UV absorbers volatilize during extrusion which results in wasted material, operator discomfort, and plating out of residues.

Accordingly, there remains a need in the art for an easily processable polyester which displays improved barrier, acceptable crystallization even without crystallization additives, and improved UV absorption. Moreover, there is a need for polyester articles having improved UV absorption to protect against UV degradation.

SUMMARY OF THE INVENTION

The present invention relates to a polyester having improved UV absorption comprising a residue of a dicarboxylic acid component comprising isophthalic acid and terephthalic acid, a residue of a glycol component comprising ethylene glycol, and a residue of an aromatic diol derivative. The aromatic diol derivative provides improved UV absorption to the resulting polyester. The polyester provides improved gas barrier properties and UV absorption in articles (containers or bottles) produced therefrom.

In accordance with the purpose(s) of this invention, as embodied and broadly described herein, this invention, in one aspect, relates to a polyester having increased UV absorption comprising (i) a residue of a dicarboxylic acid component comprising terephthalic acid and about 1 to about 20 mole % of isophthalic acid, (ii) a residue of a glycol component comprising ethylene glycol, and (iii) from about 0.01 mole % to about 15 mole % of a residue of an aromatic diol derivative, wherein the aromatic diol derivative has at least two polyester reactive groups that are capable of participating in a polyester-forming reaction and the total mole % for components (i), (ii) and (iii) is 200 mole %.

In another aspect, the present invention relates to a process for identifying a polyester of this invention from another polyester or polymer comprising: (i) providing at least one polyester of this invention and another polyester or polymer, (ii) setting a detector at a wavelength where only the polyester of this invention fluoresces strongly, (iii) exciting the polyester at this invention and the other polyester or polymer with energy, and (iv) identifying the polyester that fluoresces, wherein the fluorescing polyester is the polyester of this invention.

Additional advantages of the invention will be set forth in part in the detailed description, including the figures, which follow, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory of preferred embodiments of the invention, and are not restrictive of the invention, as claimed.

DETAILED DESCRIPTION OF THE INVENTION

Figure 1:
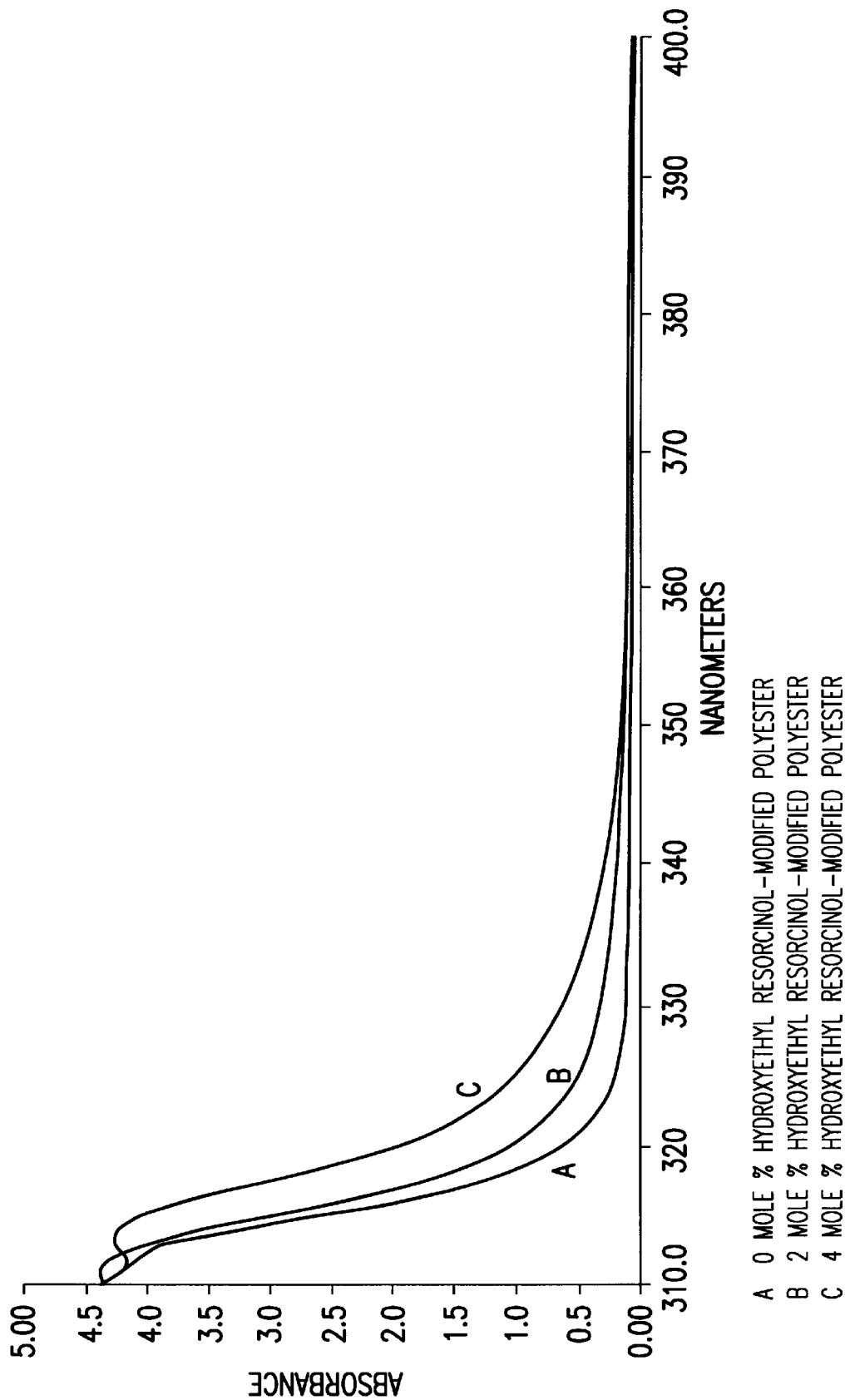
FIG. 1 is a plot of absorbance vs. wavelength for compositions having 0, 2 and 4 mole % hydroxyethyl resorcinol-modified polyester.

The present invention may be understood more readily by reference to the following detailed description of the invention, including the appended figures referred to herein, and the examples provided therein. It is to be understood that this invention is not limited to the specific processes and conditions described, as specific processes and/or process conditions for processing polyester articles as such may, of course, vary. It is also to be understood that the terminology used herein is for the purpose of describing particular embodiments only and is not intended to be limiting.

It must also be noted that, as used in the specification and the appended claims, the singular forms "a," "an" and "the" include plural referents unless the context clearly dictates otherwise.

Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

The present invention generally relates to a polyester comprising a residue of isophthalic acid, terephthalic acid, ethylene glycol and an aromatic diol derivative. "Residue," when used in reference to the components of the polyester of this invention, refers to the moiety that is the resulting product of the chemical species in a particular reaction scheme, or subsequent formulation or chemical product, regardless of whether the moiety is actually obtained from the chemical species. The present invention further relates to molded articles made from the polyesters of the present invention and methods for making the articles.

More particularly, and in a more preferred form, the present invention relates to a polyester comprising a residue of a dicarboxylic acid component comprising terephthalic acid and about 1 to about 20 mole % isophthalic acid, a residue of a glycol component comprising ethylene glycol and, preferably, about 0.01 mole % to about 15 mole % of a residue of at least one aromatic diol derivative, wherein the total mole % of all of the polyester components is 200 mole %.

Generally, the mole % for each of the components of the polyester may vary depending on the desired properties. Preferably, the polyester comprises about 60 to about 99 mole %, and more preferably, about 80 to about 99 mole % of the terephthalic acid component. The polyester preferably comprises at least about 70 mole %, and more preferably at least 85 mole % of ethylene glycol.

Yet another more preferred embodiment of this invention relates to a polyester comprising a residue of a dicarboxylic acid component comprising terephthalic acid and about 3 to about 20 mole % of isophthalic acid, a residue of a glycol component comprising ethylene glycol, and about 0.5 mole % to about 10 mole % of a residue of at least one aromatic diol derivative, wherein the total mole % for all of the polyester components is 200 mole %.

Suitable polyesters include at least one dicarboxylic acid and at least one glycol. The polyesters of the present invention comprise terephthalic and isophthalic acids in the amounts recited to provide the desired barrier. However, additional dicarboxylic acids may also be included in the polyesters of the present invention depending on the properties in the resulting polyester article that may be desired. Thus, the dicarboxylic acid component of the polyester may optionally be modified with up to about 50 mole %, and preferably up to about 20 mole % of one or more different dicarboxylic acids. Such additional dicarboxylic acids include dicarboxylic acids having from 6 to about 40 carbon atoms, and more preferably dicarboxylic acids selected from aromatic dicarboxylic acids preferably having 8 to 14 carbon atoms, aliphatic dicarboxylic acids preferably having 4 to 12 carbon atoms, or cycloaliphatic dicarboxylic acids preferably having 7 to 12 carbon atoms. Examples of suitable dicarboxylic acids include phthalic acid, naphthalenedicarboxylic acid, cyclohexanedicarboxylic acid, cyclohexanediacetic acid, diphenyl-4,4'-dicarboxylic acid, succinic acid, glutaric acid, adipic acid, azelaic acid, sebacic acid, and the like. The various isomers of naphthalenedicarboxylic acid or mixtures of isomers may be used, but the 1,4-, 1,5-, 2,6-, and 2,7-isomers are preferred. The 1,4-cyclohexanedicarboxylic acid may be in the form of cis, trans, or cis/trans mixtures. In addition, for purposes of this invention, "dicarboxylic acid" includes the lower alkyl ester or acid halide form of the diacid. Further, these ester and acid chloride forms may also be used in place of or in conjunction with the diacid form. Polyesters may be prepared from one or more of the above dicarboxylic acids.

Typical glycols used in the polyester include aliphatic glycols containing from two to about ten carbon atoms, and cycloaliphatic glycols containing 7 to 14 carbon atoms. Preferred glycols include ethylene glycol, 1,4-butanediol, 1,6-hexanediol, 1,4-cyclohexanedimethanol, diethylene glycol and the like. The glycol component may optionally be modified with up to about 50 mole %, preferably up to about 25 mole % and most preferably up to about 15 mole % of one or more different diols. Such additional diols include cycloaliphatic diols preferably having 6 to 20 carbon atoms, aromatic diols containing from 6 to 15 carbon atoms or aliphatic diols preferably having 3 to 20 carbon atoms. Examples of such diols include: diethylene glycol, triethylene glycol, 1,4-cyclohexanedimethanol, propane-1,3-diol, butane-1,4-diol, pentane-1,5-diol, hexane-1,6-diol, 3-methylpentanediol-(2,4), 2-methylpentanediol-(1,4), 2,2,4-trimethylpentane-diol-(1,3), 2-ethylhexanediol-(1,3), 2,2-diethylpropane-diol-(1,3), hexanediol-(1,3), 1,4-di-(2-hydroxyethoxy)-benzene, 2,2-bis-(4-hydroxycyclohexyl)-propane, 2,4-dihydroxy-1,1,3,3-tetramethyl-cyclobutane, 2,2-bis-(3-hydroxyethoxyphenyl)-propane, 2,2-bis-(4-hydroxypropoxyphenyl)-propane, resorcinol, hydroquinone, catechol, bisphenol and its derivatives, and the like. Polyesters may be prepared from one or more of the above diols.

To improve UV absorption, the polyesters of the present invention further comprise at least one aromatic diol derivative. The aromatic diol derivative may be in any functionality which is capable of reacting under esterification or polycondensation conditions. That is, the aromatic diol derivative contains a functionality or reactive group therein that is capable of participating in a polyester-forming reaction. The aromatic diol derivative may also be substituted and/or unsubstituted. The unsubstituted aromatic diol derivative useful in the polyester of this invention (the derivative exists in the polyester as a residue) may generally be represented by the following formula (I):

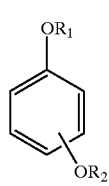

(I)

wherein $R_1$ and $R_2$ are independently H or a polyester reactive group and $R_1$ and $R_2$ are not simultaneously H. Preferably, $R_1$ and $R_2$ are both polyester reactive groups.

Suitable forms of the polyester reactive groups or functionalities for the aromatic diol derivative include a dicarboxylic acid, a glycol, a diepoxide, a diacid chloride, a dihydroxy acid, and the like. Preferably, the aromatic diol derivative has a dicarboxylic acid and/or glycol functionality. More preferred aromatic diol derivatives include derivatives of resorcinol (1,3-benzenediol), hydroquinone (1,4-benzenediol) and catechol (1,2-benzenediol).

The even more preferred aromatic diol derivatives include substituted and unsubstituted resorcinol bis(hydroxyethyl ether), substituted and unsubstituted resorcinol oxydiacetic acid, substituted and unsubstituted hydroquinone bis (hydroxyethyl ether), substituted and unsubstituted hydroquinone oxydiacetic acid, substituted and unsubstituted catechol bis(hydroxyethyl ether), substituted and unsubstituted catechol oxydiacetic acid, and the like.

Most preferably, the aromatic diol derivative is a resorcinol dicarboxylic acid and/or a glycol derivative, e.g., substituted and unsubstituted bis-hydroxyethyl resorcinol and substituted and unsubstituted resorcinol oxydiacetic acid.

In addition, mixtures of aromatic diol derivatives may be used effectively when forming the polyester of the present invention. In particular, a mixture of aromatic diol derivatives of catechol, resorcinol and hydroquinone may be prepared and used. Precursor mixtures for these derivatives can be obtained by the oxidation of phenol using hydrogen peroxide/molecular sieve, the process of which is described in U.S. Pat. No. 4,396,783, which is incorporated herein by reference. The use of nitrogen oxide/molecular sieve, the process of which is described in U.S. Pat. No. 4,982,013, which is incorporated herein by reference, may also be used to obtain precursor mixtures. These mixtures may include catechol, resorcinol and hydroquinone (the o, m and p isomers of benzenediol) and provide suitable feedstock for making the aromatic diol derivatives. The molecular sieve provides acidic sites and can also provide shape selectivity to favor the p isomer (hydroquinone). The isomer distribution from various phenol oxidations (hydroxylations) is variable according to the catalyst and conditions. Equal amounts of isomers can be expected in some cases.

Also, small amounts of multifinctional polyols such as trimethylolpropane, pentaerythritol, glycerol and the like may be used if desired. When using 1,4-cyclohexanedimethanol, it may be the cis, trans or cis/trans mixtures.

The resin may also contain small amounts of trifunctional or tetrafunctional comonomers to provide controlled branching in the polymers. Such comonomers include trimellitic anhydride, trimethylolpropane, pyromellitic dianhydride, pentaerythritol, trimellitic acid, trimellitic acid, pyromellitic acid and other polyester forming polyacids or polyols generally known in the art.

Also, although not required, additives normally used in polyesters may be used if desired. Such additives include, but are not limited to colorants, pigments, carbon black, glass fibers, fillers, impact modifiers, antioxidants, stabilizers, flame retardants, reheat aids, crystallization aids, barrier-improving platelet particles, compounds capable of improving planar stretch ratio, acetaldehyde reducing compounds, oxygen scavenging compounds, and the like.

The polyesters of the present invention are formed via conventional polyesterification. The three polymerization stages are hereinafter referred to as the esterification stage, the prepolymer stage, and the polycondensation stage. The basic conditions which define these three stages are set out below for convenience and clarity.

In the first stage of the melt-phase process, a mixture of polyester monomer (diglycol esters or dicarboxylic acids) and oligomers are produced by conventional, well-known processes. The ester exchange or esterification reaction is conducted at a temperature between 220° C. to about 250° C. and a pressure of about 0 to about 100 psig in the presence of suitable ester exchange catalysts such as lithium, magnesium, calcium, manganese, cobalt and zinc, or esterification catalysis such as hydrogen or titanium suitable forms of which are generally known in the art. The catalysts can be used alone or in combination. Preferably the total amount of catalyst is less than about 200 ppm on an elemental basis. Suitable colorants may also be added at this point to control the final color of the polyester. The reaction is conducted for about 1 to about 4 hours. It should be understood that generally the lower the reaction temperature, the longer the reaction will have to be conducted.

Generally, at the end of the esterification, a polycondensation catalyst is added. Suitable polycondensation catalysts include salts of titanium, gallium, germanium, tin, and antimony, preferably antimony or germanium or a mixture thereof. Preferably the amount of catalyst added is between about 90 and about 350 ppm when germanium or antimony is used. Suitable forms such as, but not limited to antimony oxide are well known in the art. The prepolymer reaction is conducted at a temperature less than about 280° C., and preferably between about 240° C. and about 280° C. at a pressure sufficient to aid in removing reaction products such as ethylene glycol. The monomer and oligomer mixture is typically produced continuously in a series of one or more reactors operating at elevated temperature and pressure less than one atmosphere. Alternately, the monomer and oligomer mixture could be produced in one or more batch reactors.

Next, the mixture of polyester monomer and oligomers undergoes melt-phase polycondensation to produce a low molecular weight precursor polymer. The precursor is produced in a series of one or more reactors operating at elevated temperatures. To facilitate removal of excess glycols, water, alcohols, aldehydes, and other reaction products, the polycondensation reactors are run under a vacuum or purged with an inert gas. Inert gas is any gas which does not cause unwanted reaction or product characteristics at reaction conditions. Suitable gases include, but are not limited to $CO_2$, argon, helium and nitrogen.

Temperatures for this step are generally between about 240° C. to about 280° C. and a pressure between about 0 and about 2 mm Hg. Once the desired inherent viscosity (I.V.) is reached, the polymer is pelletized. Precursor I.V. is generally below about 0.7 to maintain good color. The target I.V. is generally selected to balance good color and minimize the amount of solid stating which is required. Preferably, the I.V. of a polyester of this invention is from about 0.50 dl/g to about 1.0 dl/g. More preferably, the I.V. is from about 0.7 dl/g to about 0.85 dl/g. Inherent viscosity was measured at 25° C. using 0.50 grams of polymer per 100 ml of a solvent consisting of 60% by weight phenol and 40% by weight tetrachloroethane. The polyester composition of this invention was determined by hydrolysis GC and $^1$H-NMR.

The polyesters of the present invention are suitable for forming a variety of shaped articles, include films, sheets, tubes, preforms, molded articles, containers and the like. Suitable processes for forming said articles are known and include extrusion, extrusion blow molding, melt casting, stretch blow molding (SBM), thermoforming, and the like.

Containers of the present invention are produced using a stretch blow molding process. Stretch blow molding is accomplished in two distinct steps; first, the polyester is melted in an extruder and injected into a mold forming a preform or parison; second, the preform is then blown into the final container shape. The actual blowing of the preform must occur at a temperature slightly above the glass transition temperature of the polyester. In a "single stage" SBM process the preform is transferred from the injection mold directly to a blow molding station. During the transfer time, the preform cools to the proper blow molding temperature. In a "two stage" SBM process, the preform is ejected from the injection mold and then held at ambient temperatures for a time long enough to achieve a consistent temperature within the lot of preforms. In a separate step, the preforms are reheated to the proper blow molding temperature before being blown into the desired container shape. The specific type of process used is determined by the volume of production, or the production rate desired for a specific application, and the machine design and capabilities.

Films of the present invention were produced and tested for UV absorption. Melt cast film was produced using a laboratory scale film line which consisted of a 1 inch Killion extruder having a single flight screw, a 6 inch wide die, and a 20 mil die opening. Similar conditions were used for all compositions. The heater zones and die were set between 260 and 270° C. with a screw RPM of about 85 which produced amperage readings between 4 and 9 and a measured melt temperature between 270 and 275° C. The nominal 20 mil film passed over a chill roll (130–150° C.) and was collected on a tubular, cardboard roll. Prior to processing, the ground polymer was dried for about 6 hours at 140° C. in a dehumidified air dryer.

The polyesters of the present invention and the resulting molded articles (such as sheet, film and containers) display acceptable barrier properties, acceptable crystallization even without crystallization additives and surprisingly, improved UV absorption compared to unmodified PET. The improvements in UV absorption were quite unexpected, particularly at the low levels of aromatic diol derivative addition. FIG. 1 clearly shows that, at 325 nm, 2 mole % resorcinol bis(hydroxyethyl ether) increases the absorption of UV light from about 0.25 to about 0.5 absorption units (100% increase) and 4 mole % resorcinol bis(hydroxyethyl ether) increases the absorption of UV light from about 0.25 to about 1.1 absorption units (400% increase). Improved UV absorption provides improved capability to protect the contents, such as food and beverages, from UV degradation.

Figure 2:
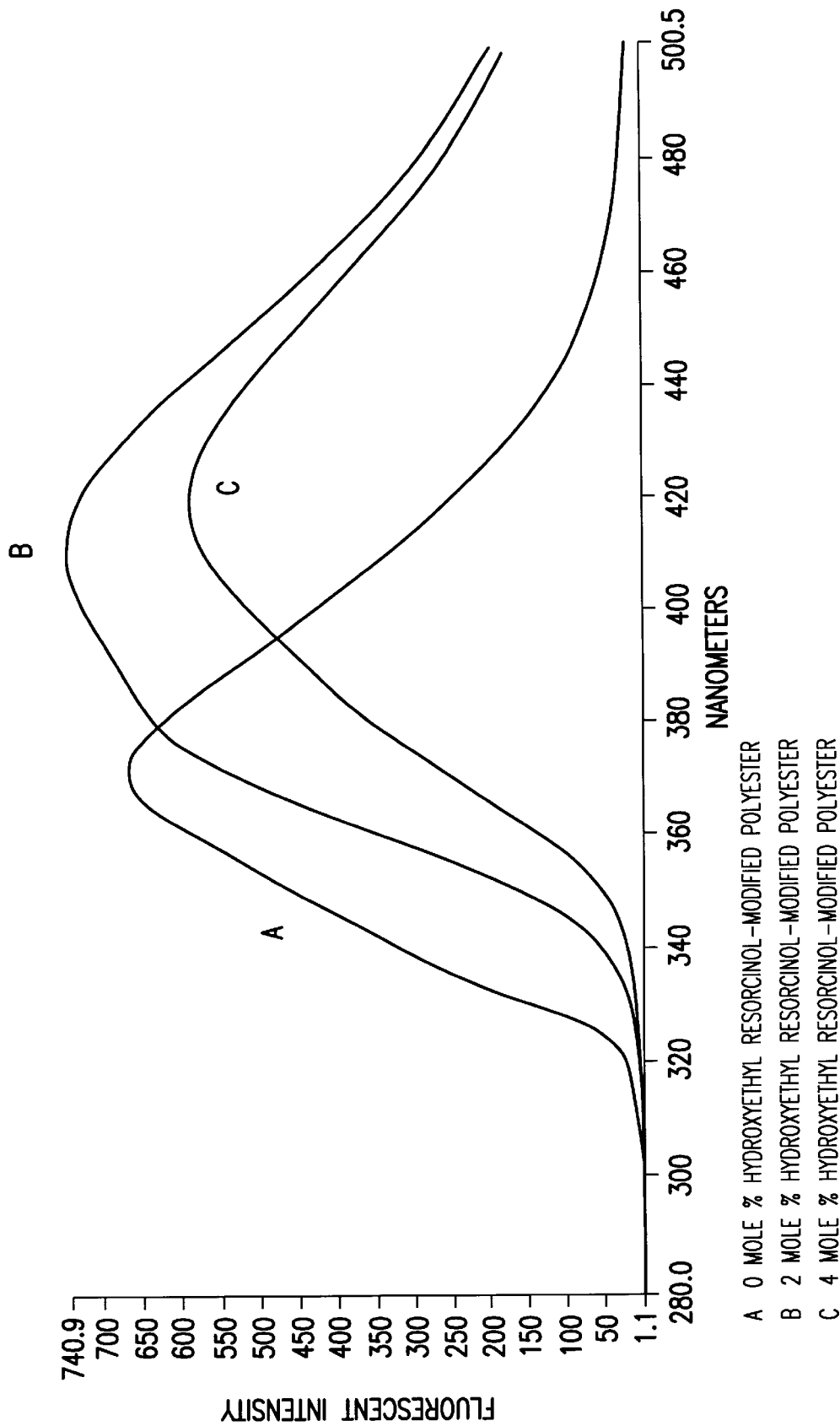
FIG. 2 is a plot of fluorescence emission intensity vs. wavelength for compositions having 0, 2 and 4 mole % hydroxyethyl resorcinol-modified polyester.

Yet another surprising and unexpected feature of the present invention is the dramatic shift in the fluorescence emission intensity peak maximum when amounts of aromatic diol derivatives within the scope of the present invention are added. FIG. 2 shows that as little as 2 mole % hydroxyethyl resorcinol shifts the fluorescence peak about 40 nm. The difference in intensities can be detected using conventional fluorescence emission detectors.

Moreover, because the residues of the aromatic diol derivative in the polyester shift fluorescence emission peak intensity, the present invention further relates to a process for sorting the polyester of the present invention from other polyesters or polymers not having a aromatic diol derivative. The process comprises setting a detector at a wavelength where the polyesters of the present invention fluoresce strongly (such as about 480 nm as shown in FIG. 2), exciting the polyester, and separating the polyesters which fluoresce. Thus, the present invention also provides a method for sorting the high barrier containers of the present invention from conventional containers without the addition of a marking compound. Alternatively, when the polyesters of the present invention are used in a multilayer structure, the shift in fluorescence intensity could be use to separate the polyesters of the present invention from another polymer layer.

EXAMPLES

The following examples are put forth so as to provide those of ordinary skill in the art with a more complete disclosure and description of how the resin compositions claimed herein are made and evaluated. They are not intended to limit the scope of what the inventors regard as their invention. Efforts have been made to insure accuracy with respect to numbers (e.g., amounts, temperature, etc.) but some errors and deviations should be accounted for. Unless indicated otherwise, parts are by weight, temperature is in ° C. or is at room temperature and pressure is at or near atmospheric.

Example 1

This example illustrates the preparation of a polyester comprising 90 mole % terephthalic acid residue units, 10 mole % isophthalic acid residue units, 96 mole % ethylene glycol residue units and 4 mole % resorcinol bis (hydroxyethyl ether) residue units.

A mixture of 218.3 g (1.125 mole) dimethyl terephthalate, 24.3 g (0.125 mole) dimethyl isophthalate, 155.0 g (2.5 mole) ethylene glycol, 9.9.g (0.05 mole) resorcinol bis (hydroxyethyl ether), 0.0048 g Ti (20 ppm) in butanol, 0.1032 g Mn (55 ppm) in ethylene glycol, 0.0192 g Co (80 ppm) in ethylene glycol, 0.0552 g Sb (230 ppm) in ethylene glycol, and 0.0292 g P in ethylene glycol (P added after heating at 220° C. for 1 hour) was placed in a 1000 ml flask. The flask was equipped with an inlet for nitrogen, a metal stirrer, and a short distillation column. The flask was placed in a Belmont metal bath already maintained at 140° C. and the contents of the flask were progressively heated to 190° C., and held at 190° C. for 2 hours. The temperature was raised to 220° C. for 1 hour (and subsequently added phosphorous in the form of Merpol A), and then heated to 275° C. for 15 minutes. At 275° C., a final vacuum of 0.3 mm was applied gradually over a 12-minute period. The 0.30 mm full vacuum was maintained for approximately 60 minutes. A medium high melt viscosity, clear blue polymer was obtained with an inherent viscosity of 0.53 dL/g and a melting endotherm at 222° C.

Comparative Example 1

This example illustrates the preparation of a polyester comprising 90 mole % terephthalic acid residue units, 10 mole % isophthalic acid residue units, and 100 mole % ethylene glycol residue units.

A mixture of 218.3 g (1.125 mole) dimethyl terephthalate, 24.3 g (0.125 mole) dimethyl isophthalate, 155.0 g (2.5 mole) ethylene glycol, 0.0048 g Ti (20 ppm) in butanol, 0.1032 g Mn (55 ppm) in ethylene glycol, 0.0192 g Co (80 ppm) in ethylene glycol, 0.0552 g Sb (230 ppm) in ethylene glycol, and 0.0292 g P in ethylene glycol (P added after heating at 220 C. for 1 hour) was placed in a 1000 ml flask. The flask was equipped with an inlet for nitrogen, a metal stirrer, and a short distillation column. The flask was placed in a Belmont metal bath already maintained at 140° C. and the contents of the flask were progressively heated to 190° C., and held at 190° C. for 2 hours. The temperature was raised to 220° C. for 1 hour (and subsequently added phosphorous in the form of Merpol A), and then heated to 275° C. for 15 minutes. At 275° C., a final vacuum of 0.3 mm was applied gradually over a 12-minute period. The 0.30 mm full vacuum was maintained for approximately 60 minutes. A medium high melt viscosity, clear blue polymer was obtained with an inherent viscosity of 0.56 dL/g and a melting endotherm at 232° C.

Throughout this application, where publications are referenced, the disclosures of these publications in their entireties are hereby incorporated by reference into this application in order to more fully describe the state of the art to which the invention pertains.

Finally, it is to be understood that various other modifications and/or alterations may be made without departing from the spirit of the present invention as outlined herein.

What is claimed is:

1. A polyester having increased UV absorption comprising:
    (i) a residue of a dicarboxylic acid component comprising terephthalic acid and from about 1 to about 20 mole % of isophthalic acid,
    (ii) a residue of a glycol component comprising ethylene glycol, and
    (iii) from about 0.01 mole % to about 15 mole % of a residue of an aromatic diol derivative, wherein the aromatic diol derivative has at least two polyester reactive groups that are capable of participating in a polyester-forming reaction and the total mole % for components (i), (ii) and (iii) is 200 mole %.

2. The polyester of claim 1, wherein the dicarboxylic acid component further comprises phthalic acid, naphthalenedicarboxylic acid, cyclohexanedicarboxylic acid, cyclohexanediacetic acid, diphenyl-4,4'-dicarboxylic acid, succinic acid, glutaric acid, adipic acid, azelaic acid, or sebacic acid.

3. The polyester of claim 1, wherein the glycol component further comprises diethylene glycol, triethylene glycol, 1,4-cyclohexanedimethanol, propane-1,3-diol, butane-1,4-diol, pentane-1,5-diol, hexane-1,6-diol, 3-methylpentanediol-(2,4), 2-methylpentanediol-(1,4), 2,2,4-trimethylpentane-diol-(1,3), 2-ethylhexanediol-(1,3), 2,2-diethylpropane-diol-(1,3), hexanediol-(1,3), 1,4-di-(2-hydroxyethoxy)-benzene, 2,2-bis-(4-hydroxycyclohexyl)-propane, 2,4-dihydroxy-1,1,3,3-tetramethylcyclobutane, 2,2-bis-(3-hydroxyethoxyphenyl)-propane, 2,2-bis-(4-hydroxypropoxyphenyl)-propane, resorcinol, hydroquinone, or catechol.

4. The polyester of claim 1, wherein the polyester reactive group comprises a carboxylic acid, an alcohol, an epoxide, an acid halide or a hydroxy acid.

5. The polyester of claim 1, wherein the aromatic diol derivative is a resorcinol, catechol or hydroquinone derivative.

6. The polyester of claim 1, wherein the aromatic diol derivative is a substituted or unsubstituted resorcinol bis (hydroxyethyl ether), a substituted or unsubstituted resorcinol oxydiacetic acid, a substituted or unsubstituted hydroquinone bis(hydroxyethyl ether), a substituted or unsubstituted hydroquinone oxydiacetic acid, a substituted or unsubstituted catechol bis(hydroxyethyl ether), a substituted or unsubstituted catechol oxydiacetic acid, or a mixture thereof.

7. The polyester of claim 1, wherein the aromatic diol derivative is substituted or unsubstituted resorcinol bis (hydroxyethyl ether), substituted or unsubstituted resorcinol oxydiacetic acid, or a mixture thereof.

8. The polyester of claim 1, wherein the aromatic diol derivative is unsubstituted resorcinol bis(hydroxyethyl ether).

9. The polyester of claim 1, wherein the aromatic diol derivative is unsubstituted resorcinol oxydiacetic acid.

10. The polyester of claim 1, wherein component (i) comprises from about 3 to about 20 mole % of the residue of isophthalic acid, component (iii) is from about 0.5 mole % to about 10 mole % of the residue of at least one aromatic diol derivative, and the total mole % for components (i), (ii) and (iii) is 200 mole %.

11. The polyester of claim 10, wherein the aromatic diol derivative is unsubstituted resorcinol bis(hydroxyethyl ether).

12. The polyester of claim 10, wherein the aromatic diol derivative is unsubstituted resorcinol oxydiacetic acid.

13. The polyester of claim 1 having a UV absorption of at least 0.1 absorption units.

14. The polyester of claim 1 having an I.V. from about 0.7 dL/g to about 0.85 dL/g.

15. An article formed from the polyester of claim 1.

16. The article of claim 15 in the form of a container.

17. The article of claim 15 in the form of a bottle.

18. The article of claim 15 in the form of a film.

* * * * *

UNITED STATES PATENT AND TRADEMARK OFFICE
CERTIFICATE OF CORRECTION

PATENT NO : 6,054,551
DATED : April 25, 2000
INVENTOR(S) : David D. Cornell, *et al.*

It is certified that error appears in the above-identified patent and that said Letters Patent are hereby corrected as shown below:

Title page, column 2, "Attorney, Agent, or Firm," change "Cheryl J. Tubach" to --Karen A. Harding--.

Title page, item [57] Abstract, and column 2, line 4, after "terephthalic" insert --acid--."

Signed and Sealed this

Fifteenth Day of May, 2001

Attest:

NICHOLAS P. GODICI

*Attesting Officer*   *Acting Director of the United States Patent and Trademark Office*